(12) United States Patent
Maggio et al.

(10) Patent No.: US 6,275,092 B1
(45) Date of Patent: Aug. 14, 2001

(54) ACTIVE DAMPING CIRCUIT

(75) Inventors: Kenneth J. Maggio, Dallas; Patrick M. Teterud, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/441,000

(22) Filed: Nov. 16, 1999

(51) Int. Cl.[7] .................................................. H03K 17/56
(52) U.S. Cl. ........................ 327/424; 327/494; 327/508; 327/588
(58) Field of Search ................................... 327/423, 424, 327/494, 508, 587, 588, 110

(56) References Cited

U.S. PATENT DOCUMENTS

| | | | |
|---|---|---|---|
| 5,257,175 | * 10/1993 | Skelton | 363/56 |
| 5,680,264 | 10/1997 | Yamagishi | 360/46 |
| 5,737,826 | 4/1998 | Slade et al. | 29/603.15 |
| 5,768,073 | 6/1998 | Nepela et al. | 360/126 |
| 5,818,180 | * 10/1998 | Canclini | 318/254 |
| 5,859,742 | 1/1999 | Takaishi | 360/78.01 |
| 5,880,626 | 3/1999 | Dean | 327/552 |
| 5,959,498 | * 9/1999 | Sauer | 330/9 |

* cited by examiner

*Primary Examiner*—Terry D. Cunningham
*Assistant Examiner*—Quan Tra
(74) *Attorney, Agent, or Firm*—W. Daniel Swayze, Jr.; W. James Brady; Frederick J. Telecky, Jr.

(57) ABSTRACT

An active damping circuit damps the ringing effect caused by a write circuit for a disk drive. The circuit includes upper switches and lower switched current sources. A capacitive feedback is connected between the output and the lower switched current sources.

4 Claims, 2 Drawing Sheets

ACTIVE DAMPING CIRCUIT

FIELD OF THE INVENTION

The present invention relates to an active damping network, and more particularly to an active damping network for damping ringing effects and particularly undershoot in a write circuit for a disk drive.

BACKGROUND OF THE INVENTION

Disk drives are employed to store large amounts of information in bits encoded on tracks on the disk in a series of logical 1's and 0's. These logical 1's and 0's are represented in bit cells, which are areas of uniform size along the length of the track of the disk. It is desirable that the information bits be encoded on the disk as densely as practical so that a maximum amount of information may be stored. This can be achieved by increasing bit cell density on the disk, namely by reducing the size of bit cells along a particular track, thereby increasing the number of bit cells on the track. Increasing the number of bit cells per track increases the number of bits that can be encoded on each track, and therefore increases the amount of information stored.

Conventionally, logical 1's are recorded as transitions in magnetic flux on a magnetic disk for the given bit cell, and the absence of a transition indicates a logical 0. These transitions are created by switching the write current polarity through the write head. Transitions representing logical 1's are preferably placed within each bit cell near the center of the bit cell so that the data frequency (based on bit cell size and rotational speed of the disk can be accurately locked by a phase-locked loop during recovery of data from the disk and to ensure that bits are not encoded over a bit cell boundary during write operations. As bit cells are more densely packed on the track, placement of the transitions becomes even more important and difficult to precisely control. Thus, transition placement accuracy and bit cell density are two very important parameters in a write circuit for a disk drive.

Due to the inductive nature of a write circuit head and the output capacitances associated with the write circuitry, ringing effects occur in the write current signal which tends to delay the settling of the write current to its final DC value. These ringing effects adversely affect both transition placement and bit cell size. One option when ringing effects are present is to simply wait for the write current to settle to its final DC value and then enable the next transition for encoding a bit. This option means that bit cell duration must be increased to allow time for the write current to settle. While the accuracy of transition placement within bit cells in such a system will not be negatively affected by the ringing of the write current, the density of bit encoding by the write circuit is poor in comparison to desired goals. Another option when ringing effects are present is to switch the write current before it has settled to its final value. This approach maintains acceptable encoding density but results in decreased placement accuracy of bit encoding and hinders subsequent recovery of data from the disk. More particularly, if the write current has not fully settled from a prior transition, switching for the next transition might commence at different, uncontrolled, current levels, which results in sporadic placement of transitions in bit cells. Therefore, both options entail undesirable performance trade-offs where ringing effects are present.

One known solution to the ringing problem has been to connect a damping resistor across the terminals of the write head. The resistive damping reduces the settling time for the write current signal flowing through the head. However, resistive damping has several negative effects on the performance of the write circuit. Since some of the write current is diverted through the damping resistor, write current through the head is reduced. To achieve the desired value of write current through the head, more current must be generated to flow through both the head and the damping resistor. More importantly, the damping resistor slows the rise time for write current transitions. This can adversely affect bit cell density. While resistive damping does reduce settling time, the slower rise times may not be acceptable for high performance write circuits. Undershoot may also occur, which could result in loss of saturation of the head media or contribute to the problem of switching from uncontrolled current levels and result in sporadic bit placement in the bit cells. Thus, there is a need for a damping system in disk drive write circuitry which overcomes the problems of ringing and the shortcomings of resistive damping solutions.

SUMMARY OF THE INVENTION

An active damping assembly is provided for a disk drive write circuit that includes capacitors positioned to provide negative feedback to the inductive load of an H-bridge circuit by applying the feedback to the H-bridge current sources.

DETAILED DESCRIPTION OF THE PRESENT INVENTION

The following invention is described with reference to figures in which similar or the same numbers represent the same or similar elements. While the invention is described in terms for achieving the invention's objectives, it can be appreciated by those skilled in the art that variations may be accomplished in view of these teachings without deviation from the spirit or scope of the invention.

Figure 1:
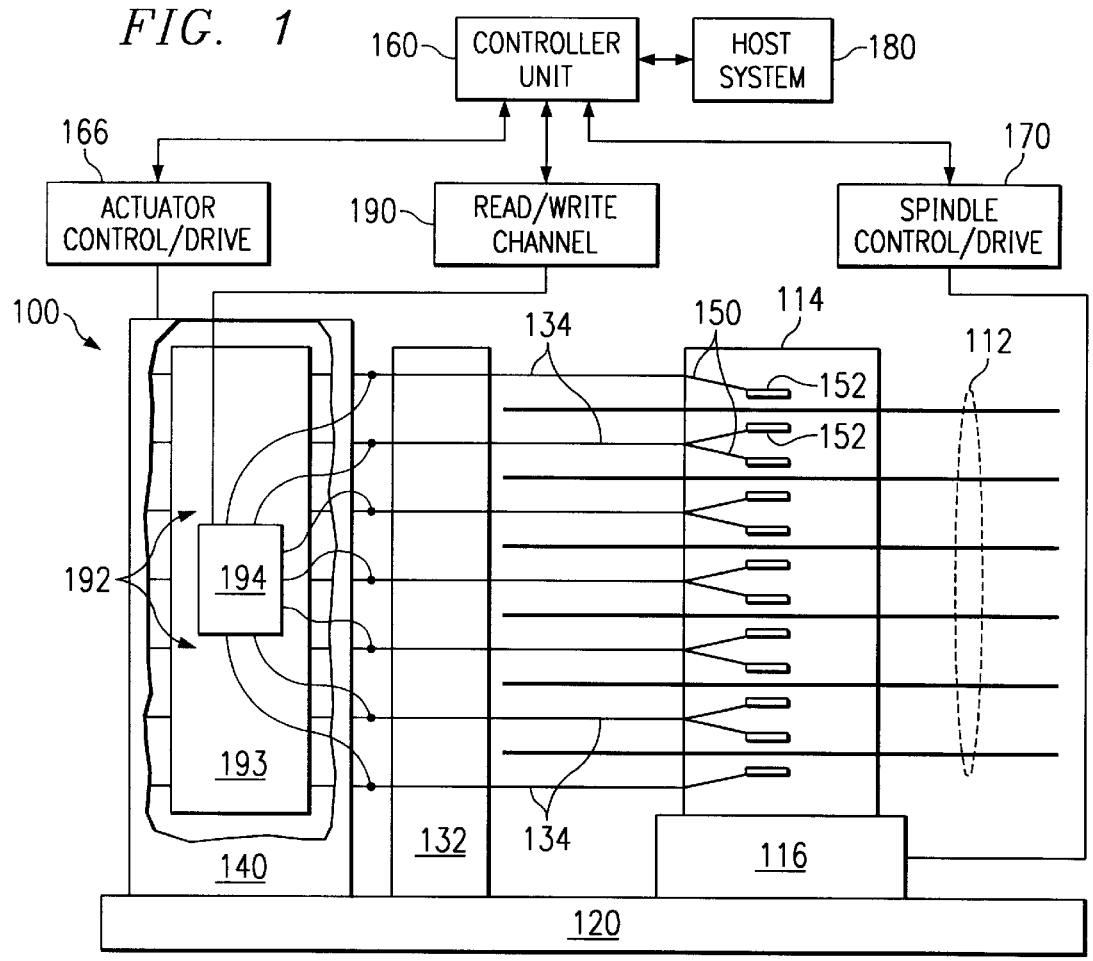
FIG. 1 is a side view of a disk drive system.
Figure 2:
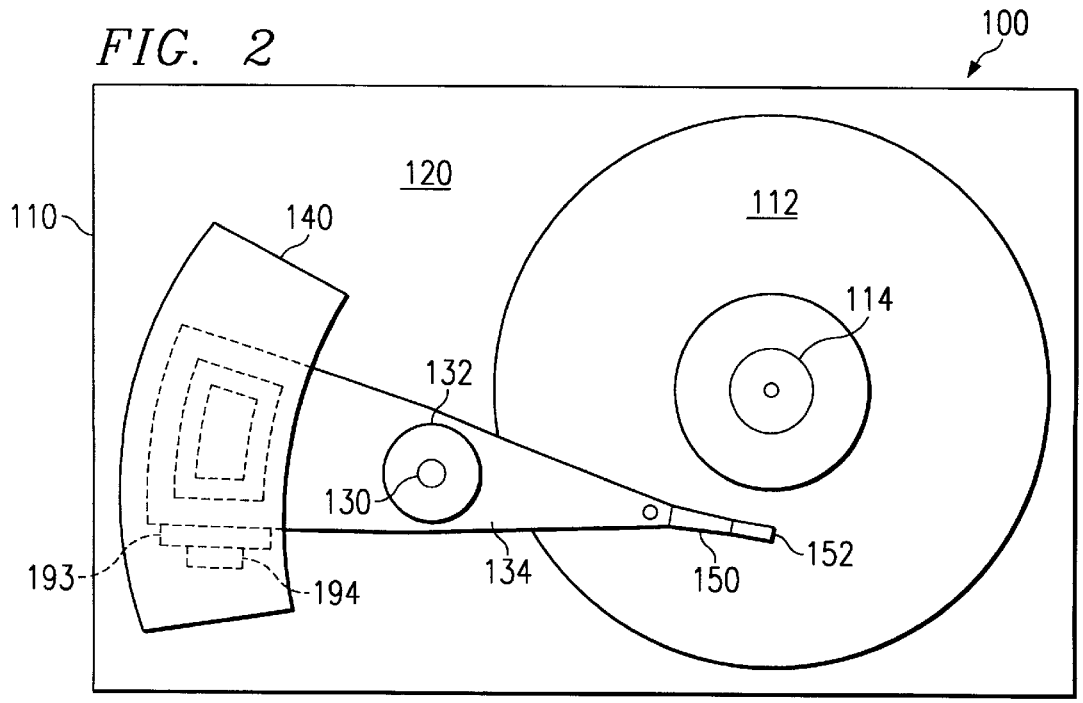
FIG. 2 is a top view of a disk drive system.

FIGS. 1 and 2 show a side and top view, respectively, of the disk drive system designated by the general reference 100 within an enclosure 110. The disk drive system 100 includes a plurality of stacked magnetic recording disks 112 mounted to a spindle 114. The disks 112 may be conventional particulate or thin film recording disk or, in other embodiments, they may be liquid-bearing disks. The spindle 114 is attached to a spindle motor 116 which rotates the spindle 114 and disks 112. A chassis 120 is connected to the enclosure 110, providing stable mechanical support for the disk drive system. The spindle motor 116 and the actuator shaft 130 are attached to the chassis 120. A hub assembly 132 rotates about the actuator shaft 130 and supports a plurality of actuator arms 134. The stack of actuator arms 134 is sometimes referred to as a "comb." A rotary voice coil motor 140 is attached to chassis 120 and to a rear portion of the actuator arms 134.

A plurality of head suspension assemblies 150 are attached to the actuator arms 134. A plurality of inductive transducer heads 152 are attached respectively to the suspension assemblies 150, each head 152 including at least one inductive write element. In addition thereto, each head 152 may also include an inductive read element or a MR (magneto-resistive) read element. The heads 152 are positioned proximate to the disks 112 by the suspension assemblies 150 so that during operation, the heads are in electromagnetic communication with the disks 112. The rotary voice coil motor 140 rotates the actuator arms 134 about the actuator shaft 130 in order to move the head suspension assemblies 150 to the desired radial position on disks 112.

A controller unit 160 provides overall control to the disk drive system 100, including rotation control of the disks 112 and position control of the heads 152. The controller unit 160 typically includes (not shown) a central processing unit (CPU), a memory unit and other digital circuitry, although it should be apparent that these aspects could also be enabled as hardware logic by one skilled in the computer arts. Controller unit 160 is connected to the actuator control/drive unit 166 which is in turn connected to the rotary voice coil motor 140. A host system 180, typically a computer system or personal computer (PC), is connected to the controller unit 160. The host system 180 may send digital data to the controller unit 160 to be stored on the disks, or it may request that digital data at a specified location be read from the disks 112 and sent back to the host system 180. A read/write channel 190 is coupled to receive and condition read and write signals generated by the controller unit 160 and communicate them to an arm electronics (AE) unit shown generally at 192 through a cut-away portion of the voice coil motor 140. The AE unit 192 includes a printed circuit board 193, or a flexible carrier, mounted on the actuator arms 134 or in close proximity thereto, and an AE module 194 mounted on the printed circuit board 193 or carrier that comprises circuitry preferably implemented in an integrated circuit (IC) chip including read drivers, write drivers, and associated control circuitry. The AE module 194 is coupled via connections in the printed circuit board to the read/write channel 190 and also to each read head and each write head in the plurality of heads 152. The AE module 194 includes the write circuit of the present invention.

Figure 3:
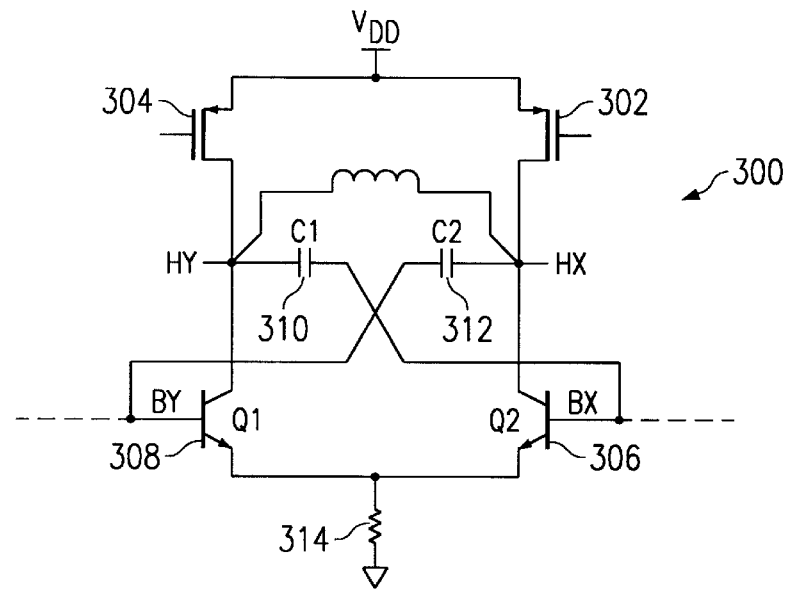
FIG. 3 illustrates an H-bridge circuit.
Figure 4:
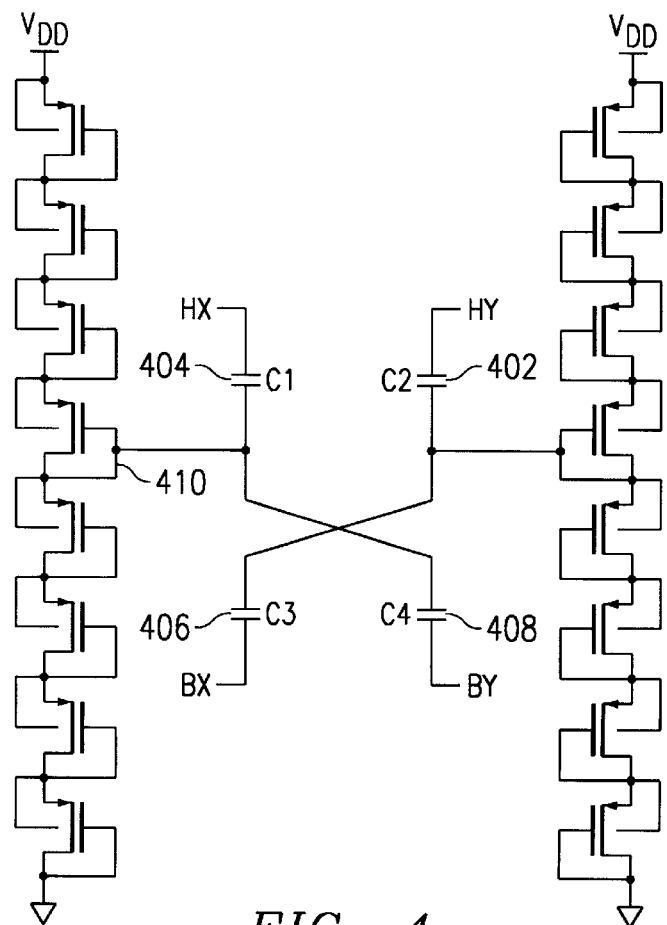
FIG. 4 illustrates an additional H-bridge circuit.

As discussed above, the electronic circuitry used to drive current through an HDD write head typically uses an H-bridge circuit 300 as illustrated in FIG. 3. FIG. 4 represents another circuit of the present invention. Typically, the write driver circuit 300 includes additional circuitry for driving the Y and X inputs, with the top two or bottom two transistors setting the current value. The purpose of the H-bridge circuit 300 is to allow electric current to be driven through the write head in either direction. When the current is driven in one direction, the north pole of the created magnetic field is in one direction, and when the current is driven is the opposite direction, a magnetic field is created with the north pole in the opposite direction. The magnetic field is then used to "write" data to the disk platter by magnetizing a small region on the disk platter.

The H-bridge circuit 300 operates to switch the drive current through the head by turning on a pair of switches to allow current to flow in a path from a supply source to ground. For example, current flows through the write head from HX to HY when the P-channel FET 302 and bipolar transistor 308 are turned on. Although specific types of FETs and bipolar devices are shown for circuit 300, other types of transistors and FETs could be used in the H-bridge circuit interchangeably. All bipolar transistors could be used, or all FET's could be used. Similarly, current flows in the opposite direction through the write head when P-channel FET 304 and bipolar transistor 306 are turned on. The DC operating point of the write head is the voltage at either side of the head when write current has settled through the head at its desired current setting.

Since the write head is an inductive load, there are voltage and current swings (a characteristic transient ring) at the HX and HY outputs when the current through the head is reversed rapidly. It is desirable to increase the write frequency of the write head current transition for higher data rates. To achieve this without adverse effects, the ringing period of the HX and HY write outputs should be reduced.

The source of PFET 304 is connected to a voltage supply $V_{DD}$ and the source of PFET 302. The gate of PFET 304 and the gate of PFET 302 are connected to control circuitry to control the operation of PFET 304 and PFET 302, respectively. PFET 304 and PFET 302 form the upper control switches for the write head current. The drain of PFET 304 is connected to terminal HY and to capacitor 310. Additionally, the drain of PFET 304 is connected to the collector of bipolar transistor 308. The emitter of transistor 308 is connected to resistor 314 which is connected to ground. Transistors 306 and 308 form the lower control circuits and H-bridge current source. Additionally, the emitter of transistor 308 is connected to the emitter of bipolar transistor 306. The base of transistor 308 is connected to capacitor 312. The collector of transistor 306 is connected to capacitor 312.

The base of transistor 306 is connected to capacitor 310, and the collector of transistor 308 is connected to capacitor 310 to form a feedback loop of the voltage at terminal HY. The connections to capacitor 312 form a feedback loop of the voltage at terminal HX.

The present invention provides feedback from the collector of a first transistor at a first side of the H-bridge circuit to the base of a second transistor on the second side of the H-bridge circuit. For example, capacitor 312 provides feedback from the collector of transistor 306 to the base of transistor 308. This capacitor provides negative feedback of the voltage at terminal HX to the base of transistor 308.

$$V_{HX} = I_{PFET\ 302} \cdot R_{PFET\ 302}$$

$$V_{B\ 308} \approx V_{HX}$$

Thus, capacitor 312 applies a fraction of the voltage of HX to the base of transistor 308. During a write transition, a rise in voltage $V_{HX}$ raises the voltage at the base of transistor 308. Raising the voltage at the base of transistor 308 results in more current through the collector to the emitter of transistor 308 via the inductive load which pulls the voltage $V_{HX}$ down. As the voltage $V_{HX}$ is lowered, the voltage at the base of transistor 308 is decreased, thus decreasing the collector current of transistor 308 which in turn raises the voltage at $V_{HX}$. Thus, the capacitor limits the voltage $V_{HX}$ from ringing. This sequence of events decreases the settling time of the writer output voltage $V_{HX}$, reducing the current ringing through the inductive load. Similar operation occurs when the other half of the H-bridge operates. When PFET 304 and bipolar transistor 306 are turned on, capacitor 310 provides feedback from the collector of bipolar transistor 308 to the base of bipolar transistor 306.

FIG. 4 illustrates another embodiment of the present invention.

In FIG. 4, the connection between terminal HX and the base of transistor 308 has two capacitors in series, namely capacitor 404 and capacitor 408. The junction between capacitors 404 and 408 is biased at mid supply to prevent breakdown of capacitors, which could be 5V, by a series of PFETs connected between the supply voltages.

Although the present invention has been described with reference to particular embodiments, workers skilled in the art will recognize that changes may be made in the details of the invention without departing from the spirit and scope of the invention.

What is claimed is:

1. An active damping circuit, comprising:

an H-bridge circuit having upper control circuits and lower control circuits; and a feedback circuit for providing feedback to said H-bridge circuit, wherein said lower control circuits include a first lower control circuit and a second lower control circuit, and said feedback circuit is connected between said first lower control circuit and said second lower control circuit.

2. An active damping circuit as in claim 1, wherein said feedback circuit is a capacitor.

3. An active damping circuit as in claim 1, wherein said feedback circuit is one of two feedback circuits.

4. An active damping circuit, comprising:

an H-bridge circuit having upper control circuits and lower control circuits; and a feedback circuit for providing feedback to said H-bridge circuit, wherein said feedback circuit is two capacitors connected in series with a junction between said two capacitors being biased at mid supply voltage.

\* \* \* \* \*